UNITED STATES PATENT OFFICE 2,615,791

SEPARATION OF HYDROGEN HALIDES FROM OLEFINICALLY UNSATURATED COMPOUNDS

John H. Raley, Walnut Creek, Calif., assignor to Shell Development Company, San Francisco, Calif., a corporation of Delaware No Drawing. Application November 25, 1949, Serial No. 129,507

7 Claims. (Cl. 23—154)

This invention relates to the separation of hydrogen halides from mixtures containing said halides together with one or more olefinically unsaturated organic compounds, and it is particularly concerned with a method for inhibiting reaction between the mixture components during their separation by fractionation.

Mixtures containing a hydrogen halide and one or more olefinically unsaturated organic compounds are commonly produced in large volume as by-products in a wide variety of industrial processes. Representative processes of this character are those involving halo-substitution of olefins or other unsaturated compounds, with the concomitant formation of hydrogen halide, as well as those wherein the hydrogen halide is itself reacted with the unsaturated organic compound. These mixtures are seldom discarded since the components thereof are valuable raw materials which are either recycled to the reactor or used in other chemical processes.

A number of methods for separating mixtures of this character are known to the art. In one the mixture is passed through water or an aqueous solution which selectively dissolves the hydrogen halide. However, while removal of the halide component of the mixture in this fashion is relatively simple, the same may not be said of the step whereby anhydrous hydrogen halide is recovered from the wash solution. The latter step is normally so expensive as to be economically unfeasible. In other separation methods the hydrogen halide is taken up by one or the other of a wide variety of chemicals in the form of a loose molecular adduct which is thereafter decomposed. This method, while expensive to operate due to large chemical and handling costs, is particularly effective when dealing with mixtures containing hydrogen fluoride, though it is not well adapted to the removal of the other hydrogen halides from such mixtures. The easiest method for separating the mixture components is by fractionation, the hydrogen halide usually distilling off at the top of the still and the unsaturated component being collected as bottoms. The drawback of this method is that whenever the separation is effected in metallic fractionating columns, especially those made up of a ferrous alloy, there ensues extensive hydrohalogenation of the unsaturated component of the mixture, it having been observed that this reaction is catalyzed by the salts which are formed in the column as the metal surfaces therein are attacked by acid. Even in the case of Ni-lined fractionation columns, considerable hydrohalogenation occurs once the liner has become so corroded as to give rise to the presence of appreciable amounts of nickel halide in the column.

It is therefore an object of this invention to provide an efficient and economical method for separating components of mixtures made up of hydrogen halide and one or more olefinically unsaturated compounds. A further object is to provide a method whereby mixtures of this character may be fractionated without material loss attributable to interaction of the type induced by a catalyst. A more particular object is to provide an efficient separation method of this character for use with mixtures made up of hydrogen chloride and a normally gaseous olefinic hydrocarbon. The nature of these as well as other objects of the invention will become more fully apparent on a consideration of the descriptive portion to follow.

The present invention is based on the discovery that the losses normally encountered during fractionation of mixtures made up of hydrogen halide and an olefinically unsaturated compound by reason of catalytically-induced interaction of the mixture components may be greatly reduced by the addition of a small amount of a nitrile or isonitrile to the mixture undergoing fractionation. Surprisingly, such additions may be as small as a few parts per million and still be entirely effective, though larger quantities may be added without harmful result. While the benefits of nitrile or isonitrile addition are particularly manifest in fractionation operations, the invention may also usefully be employed in reducing the interaction which takes place in liquid hydrogen halide-containing mixtures of this character which are stored, transported, or otherwise maintained in contact with a material which acts as a hydrohalogenation catalyst.

A wide variety of mixtures may be separated by fractionation into their respective components with reduced component-interaction according to the process of this invention. In addition to the hydrogen halide, whose concentration in the mixture may vary within wide limits, the mixture may contain any organic compound possessing one or more olefinic double bonds. Organic materials of this character which are commonly encountered in admixture with a hydrogen halide, and which may be separated therefrom in improved yield by a practice of the present invention, include alkenes, aralkenes and alicyclic compounds containing one or more olefinic linkages and embracing besides the unsaturated hydrocarbons, their various substitution and addition products which contain at least one olefinic double bond. Representative unsaturated compounds found in admixture with hydrogen halides are ethylene, propylene, 2-chloropropene, 1- and 2-butene, 1-chloro-2-butene, 3-methyl-1-butene, 2-methyl-2-butene, 3,3-dimethyl-1-butene, n-octene, 7-methyl-2-octene, 1-hexadecene, cyclohexene, 1,3-butadiene, isoprene, piperylene, 2-ethyl-1,3-butadiene, 1,5-hexadiene, 3-phenyl-1-propene, and 1-phenyl-2-butene. These compounds may be present with the hydrogen halide either as individual compounds or as mixtures thereof. Further, the mixture may include other materials such as paraffins and the undesired hydrohalogenation product per se.

The nitriles which are useful in suppressing reaction in the subject, hydrogen halide-containing mixtures may be selected from a wide variety of compounds, representative nitriles being, for example, hydrogen cyanide, acetonitrile, oxalonitrile, propionitrile, n-butyronitrile, isobutyronitrile, trimethylacetonitrile, caprinitrile, tridecanenitrile, tetradecanenitrile, capronitrile, stearonitrile, palmitonitrile, succinonitrile, benzonitrile, cyanozen chloride, phthalonitrile, cyclohexanecarbonitrile, crotononitrile, oleonitrile, myristonitrile, 2-naphthonitrile, 1,3,5-pentanetricarbonitrile, 5-pyrimidinecarbonitrile, cyclohexanepropionitrile, acrylonitrile and methacrylonitrile, as well as those nitriles which contain other substituents than the cyano (—CN) group, as, for example, alpha-chlorobutyronitrile, beta-aminopropionitrile, alpha-cyanopropionyl chloride, p-cyanobenzaldehyde and alpha-hydroxyisobutyronitrile. Representative isonitriles which are useful in suppressing reaction in the contemplated mixtures include: methyl isocyanide, ethyl isocyanide, butyl isocyanide, isopropyl isocyanide, and phenyl isocyanide. While all these and other nitrile and isonitrile compounds are effective reaction suppressants when employed either singly or in any combination with one another in the hydrogen halide-containing mixtures, the alkane nitriles comprise a preferred class of additives for use in the present invention, representative alkane nitriles being acetonitrile, propionitrile, caprinitrile and tetradecanenitrile. For convenience and brevity of description, the term "nitrile" is to be taken hereinafter as embracing both the true nitriles as well as those having the isonitrile (isocyanide) structure.

As has been noted above, the catalytically-induced hydrohalogenation occurring in the liquid mixture can be greatly reduced by the addition of a nitrile in even extremely small amount. Thus, it suffices to maintain a minimal nitrile concentration in the liquefied mixture of only 5 or 10 parts per million (p. p. m.), and in some cases amounts as low as but 1 or 2 p. p. m. have given excellent results. On the other hand, it is preferred that the nitrile concentration in the liquid be from about 25 to 500 p. p. m. Larger amounts than this may be, and frequently are, used on occasion, but the inhibitory effect of such larger amounts is not materially greater than that obtained when the nitrile concentration falls within this preferred range.

The nitrile may be added to the liquid mixture under treatment in any desired manner. In the case of batch operation, the requisite amount of nitrile may be supplied in a single addition, following which the liquid can be distilled in the usual fashion. On the other hand, when the liquid mixture is subjected to continuous distillation in a fractioning column, it is necessary that the nitrile be added in a continuous or semi-continuous manner and in such a fashion as to distribute the same throughout all portions of the liquid in the column which are undergoing fractionation. Such distribution is usually accomplished by adding the nitrile near the top of the fractionating column, or at least well above the point of entry of the incoming feed stream.

While addition of nitrile proves effective in reducing catalytically-induced interaction between a hydrogen halide and any one or more of a variety of olefinically unsaturated compounds, the invention finds its widest employment in connection with mixtures made up essentially of hydrogen chloride and an olefinic hydrocarbon, of which propylene is a good example. Accordingly, the invention will be more particularly described hereinafter as it relates to the fractionation of hydrogen chloride-propylene mixtures.

Heavy losses due to formation of isopropyl chloride have heretofore been encountered in fractionating hydrogen chloride-propylene mixtures, though some methods have proved to be more efficient than others. Thus, when the operation is effected in a stainless steel fractionating column, losses attributable to isopropyl chloride formation as high as 75% of the theoretical maximum are commonly encountered. When nickel fractionating equipment is used this loss may be reduced to about 10 to 15% of theoretical provided the feed stream be provided with from about 20 to 200 p. p. m. of water. However, this is still an undesirably high conversion factor, and, furthermore, the presence of water in the feed is disadvantageous since it greatly accelerates corrosion of the metal surfaces in the column. It has now been found that the amount of isopropyl chloride formed in the fractionating column may be reduced still further, i. e., to but about 3–5% of theoretical, by dissolving a nitrile in the liquid mixture undergoing fractionation. As noted above, the nitrile concentration maintained in the liquid may be as small as 5 to 10 p. p. m., though it is preferably from about 25 to 500 p. p. m. and may be considerably more. By the practice of this method the loss of mixture components to isopropyl chloride is reduced to substantially that encountered when the fractionation is conducted in glass apparatus, and the same may be said of any other hydrogen halide-olefinically unsaturated compound-containing mixture under study.

The following examples are illustrative of the present invention in various of its embodiments:

Example I

A gaseous stream consisting essentially of 28% hydrogen chloride, 71% propylene and the balance isopropyl chloride was continuously fed at the rate of 10,875 lbs./hr. and at a temperature of approximately 40° C., to a mid-portion of a 40 plate nickel-lined fractionating column operated at a pressure of 225 p. s. i. g., a head temperature of −18° C., and a reboiler temperature of 41° C. Essentially pure hydrogen chloride was withdrawn as the overhead product from this column, the same being refrigerated and returned to the top of the column as reflux in the ratio of approximately 7 parts for each part withdrawn as product. The propylene and any isopropyl chloride formed during the operation or present in the feed stream were taken off as bottoms. Under these conditions isopropyl chloride was formed at the rate of from 40 to 50 tons per day, representing a conversion of from about 51 to 64% of theoretical. The foregoing operation was then repeated, but with the addition of approximately 100 p. p. m. of water in the feed stream. This water-injection treatment had the desirable result of decreasing the amount of isopropyl chloride formed to about 10 tons per day, though at the same time it gave rise to considerable corrosion of the internal surfaces of the column. In a series of other operations, water injection was stopped and acetonitrile was continuously pumped into the column at the 38th tray at rates of 1.02, 1.1, 1.25, 1.72, 1.41 and 1.49 lbs./hr. in the respective operations, these amounts being sufficient to provide acetonitrile concentrations varying from about 39 to 67 p. p. m. in the liquid portions present on the 38th and those lower trays which contained substantial amounts of HCl, though the acetonitrile concentration in the bottoms exceeded 100 p. p. m. In the case of all operations conducted in the presence of the acetonitrile additive, the amount of isopropyl chloride produced ranged from approximately 3 to 4 tons per day, representing a conversion to isopropyl chloride of but about 4 to 5% of theoretical, and furthermore, there was no appreciable corrosion of the column surfaces. In other operations wherein the water and acetonitrile treatments here described are combined, it has not been possible to make any further reduction in the amount of isopropyl chloride produced. Each of the operations discussed herein involved at least several days of continuous operation.

*Example II*

In this operation a hydrogen chloride-propylene mixture containing approximately 30% hydrogen chloride is fractionated under substantially the same conditions as described in the foregoing example, except that here the fractionating column is fabricated of stainless steel instead of nickel. When neither water nor a nitrile is injected into the column, the losses of mixture components due to formation of isopropyl chloride exceed 75% of theoretical. This loss is reduced to approximately 20% by injecting 100 parts per million of water into the feed stream. However, water-injection so accelerates corrosion of the steel surfaces in the column as to make this treatment impractical for commercial use. In another operation, conducted with an anhydrous feed, the column is supplied with acetonitrile in an amount sufficient to maintain a concentration of approximately 100 parts per million thereof in the liquid undergoing fractionation, this addition having the effect of reducing isopropyl chloride formation to but about 5% of theoretical. In still other operations, like amounts of tetradecanenitrile, benzonitrile, and ethyl isocyanide are substituted for acetonitrile, though without effect on the yield of isopropyl chloride, the same remaining at about 5% of theoretical, just as is the case when acetonitrile is employed as the nitrile additive.

*Example III*

In this operation a liquid mixture containing equi-molar amounts of hydrogen chloride and propylene was fed at 0° C. under a pressure of 400 p. s. i. g. through a glass-lined reaction chamber having a volume of 83 cc. at such a rate as to provide a residence time of 9 minutes in said chamber. This chamber contained 14 grams of a hydrochlorination catalyst prepared by slurrying a mixture of 30 grams of powdered silica and 10 grams of a water paste of a powdered nickel hydrogenation catalyst with 125 mm. of 3N HCl, drying the resulting slurry in air, and then calcining the pre-dried material by heating at 200° C. for from 4 to 6 hours under vacuum. Under these conditions it was found that the conversion to isopropyl chloride was approximately 79% of theoretical. By adding 30 parts per million of acetonitrile to the feed stream, the conversion to isopropyl chloride was reduced to 11%. In a succeeding operation, 58 parts per million of a product made up of approximately 25% hexadecanenitrile, 70% of octadecanenitrile and 5% octadecenenitrile were substituted in the feed stream for the acetonitrile. In this case the conversion to isopropyl chloride was 12% of theoretical.

As may be seen from the foregoing examples, it is an important feature of the present invention that the benefits of nitrile addition are achieved no matter what metal be used in the fabrication of the fractionating column or other container for the liquid mixture. Further, with the addition of a nitrile it no longer becomes necessary to inject water into the feed stream in order to reduce the isopropyl chloride production rate. In fact, the process of the present invention is preferably conducted in the total absence of water with at least no more than about 10 parts per million of water in the feed stream.

As stressed in the foregoing descriptive portions of the invention, the process thereof is applied with particular advantage to the separation of hydrogen chloride from propylene or other olefinic hydrocarbons. It is to be understood, however, that the invention is in no wise limited in its application to the treatment of such mixtures but may also be applied to the separation to any hydrogen halide from any organic compound containing one or more olefinic linkages in its molecular structure.

The percentages given herein are on a weight basis.

The invention claimed is:

1. In a method for separating the hydrogen halide and the olefinically unsaturated organic components of a liquid mixture by fractionation, the improvement comprising effecting said fractionation in the presence of at least one compound selected from the group consisting of nitriles and isonitriles which is dissolved in the said liquid mixture.

2. In a method for separating the hydrogen halide and the olefinically unsaturated organic components of a liquid mixture by fractionation, the improvement comprising effecting said fractionation in the presence of an alkane nitrile which is dissolved in said liquid mixture.

3. The method of claim 2 wherein the nitrile is acetonitrile.

4. In a method for separating the hydrogen halide and the olefinically unsaturated organic components of a mixture wherein said mixture is continuously fed to a fractionating column operated under such conditions as to maintain the mixture in the liquid state, with the hydrogen halide being distilled off at the top of the column and the olefinic component being withdrawn therefrom as bottoms, the improvement comprising maintaining a concentration of at least 5 parts per million of a nitrile in the liquid undergoing fractionation in said column.

5. In a method of separating the hydrogen chloride and olefinic hydrocarbon components of a mixture wherein said mixture is continuously fed to a fractionating column operated under such conditions as to maintain the mixture in the liquid state, with the hydrogen chloride being distilled off at the top of the column and the olefinic hydrocarbon being withdrawn as bottoms therefrom, the improvement comprising maintaining a concentration of from about 25 to 500 parts per million of a nitrile in the liquid undergoing fractionation in said column.

6. The method of claim 5 wherein the nitrile is an alkane nitrile.

7. The method of claim 5 wherein the olefinic hydrocarbon is propylene and the nitrile is acetonitrile.

JOHN H. RALEY.

REFERENCES CITED

The following references are of record in the file of this patent:

UNITED STATES PATENTS

| Number | Name | Date |
| --- | --- | --- |
| 2,058,465 | Kharasch | Oct. 27, 1936 |
| 2,328,275 | Heard | Aug. 31, 1943 |